(12) United States Patent
Elboth

(10) Patent No.: US 11,867,859 B2
(45) Date of Patent: Jan. 9, 2024

(54) SEISMIC DATA ACQUISITION WITH DUAL/TRIPLE SOURCES AND HEXA-SOURCE

(71) Applicant: SERCEL, Carquefou (FR)

(72) Inventor: Thomas Elboth, Oslo (NO)

(73) Assignee: SERCEL, Carquefou (FR)

( * ) Notice: Subject to any disclaimer, the term of this patent is extended or adjusted under 35 U.S.C. 154(b) by 754 days.

(21) Appl. No.: 16/139,305

(22) Filed: Sep. 24, 2018

(65) Prior Publication Data
US 2020/0096662 A1    Mar. 26, 2020

(51) Int. Cl.
*G01V 1/38* (2006.01)

(52) U.S. Cl.
CPC .......... *G01V 1/3808* (2013.01); *G01V 1/3843* (2013.01); *G01V 1/3861* (2013.01)

(58) Field of Classification Search
CPC ... G01V 1/3808; G01V 1/3843; G01V 1/3861
See application file for complete search history.

(56) References Cited

U.S. PATENT DOCUMENTS

| | | | | |
|---|---|---|---|---|
| 5,973,995 A * | 10/1999 | Walker | ............... | G01V 1/3808 367/20 |
| 7,466,632 B1 * | 12/2008 | Sorli | ............... | G01V 1/3835 367/153 |
| 8,416,640 B2 * | 4/2013 | Fleure | ............... | G01V 1/3808 367/56 |
| 9,952,341 B2 * | 4/2018 | Holschuh | ............... | G01V 1/308 |
| 2013/0333974 A1 * | 12/2013 | Coste | ............... | G01V 1/3808 181/119 |
| 2014/0340983 A1 * | 11/2014 | Parkes | ............... | G01V 1/137 367/13 |
| 2015/0260867 A1 | 9/2015 | Abma et al. | | |
| 2018/0045841 A1 | 2/2018 | Grenie et al. | | |

FOREIGN PATENT DOCUMENTS

| | | | | |
|---|---|---|---|---|
| GB | 2555820 A * | 5/2018 | ......... | G01V 1/3808 |
| GB | 2555820 A | 5/2018 | | |
| WO | WO-2014195503 A2 * | 12/2014 | ......... | G01V 1/3808 |
| WO | WO-2018067016 A1 * | 4/2018 | ......... | G01V 1/3861 |

OTHER PUBLICATIONS

Extended European Search Report for European Application No. 19306125.6 dated Mar. 10, 2020.

* cited by examiner

*Primary Examiner* — Isam A Alsomiri
*Assistant Examiner* — Abdallah Abulaban
(74) *Attorney, Agent, or Firm* — PATENT PORTFOLIO

(57) ABSTRACT

A method for configuring a multi-source and a hexa-source for acquiring first and second seismic datasets of a subsurface. The method includes selecting a number n of source arrays to create the multi-source; selecting a number m of sub-arrays for each source array, each sub-array having a plurality of source elements; imposing a distance D between any two adjacent source arrays of the multi-source; calculating a distance d between any two adjacent sub-arrays of a same source array so that bins associated with the first and second seismic datasets are interleaved; selecting source elements from at least six different sub-arrays of the n source arrays to create the hexa-source; and firing the multi-source to acquire the first dataset, and firing the hexa-source to acquire the second dataset.

21 Claims, 15 Drawing Sheets

| Str_sep (m) | Dual source sep(m) $Dy_{dual}(i)$ | Hexa source separation(m) $Dy_{dual\_hexa}(i)$ | Triple source sep(m) $Dy_{triple}(i)$ | Hexa source seperation(m) $Dy_{triple\_hexa}(i)$ |
|---|---|---|---|---|
| 50 | 25 | [8.33, 8.33, 8.33, 8.33, 8.33] | 16.66 | [8.33, 8.33, 8.33, 8.33, 8.33] |
| | 75 | [8.33, 8.33, 58.33, 8.33, 8.33] | 33 | [8.33, 25, 8.33, 25, 8.33] |
| | 125 | [8.33, 8.33, 108.33, 8.33, 8.33] | 66.66 | [8.33, 58.33, 8.33, 58.33, 8.33] |
| | 175 | [8.33, 8.33, 158.33, 8.33, 8.33] | 83.33 | [8.33, 75, 8.33, 75, 8.33] |
| | 225 | [8.33, 8.33, 208.33, 8.33, 8.33] | 116.66 | [8.33, 108.33, 8.33, 108.33, 8.33] |
| | 275 | [8.33, 8.33, 258.33, 8.33, 8.33] | | |
| 62.5 | 31 | [10.33, 10.33, 10.33, 10.33, 10.33] | 20.66 | [10.33, 10.33, 10.33, 10.33, 10.33] |
| | 93 | [10.33, 10.33, 72.82, 10.33, 10.33] | 41.33 | [10.33, 31, 10.33, 31, 10.33] |
| | 155 | [10.33, 10.33, 135.33, 10.33, 10.33] | 82.66 | [10.33, 72.33, 10.33, 72.33, 10.33] |
| | 217 | [10.33, 10.33, 197.83, 10.33, 10.33] | 103.33 | [10.33, 93, 10.33, 93, 10.33] |
| | 279 | [10.33, 10.33, 260.33, 10.33, 10.33] | 144.66 | [10.33, 134.33, 10.33, 134.33, 10.33] |
| 75 | 37.5 | [12.5, 12.5, 12.5, 12.5, 12.5] | 25 | [12.5, 12.5, 12.5, 12.5, 12.5] |
| | 112.5 | [12.5, 12.5, 87.5, 12.5, 12.5] | 50 | [12.5, 37.5, 12.5, 37.5, 12.5] |
| | 187.5 | [12.5, 12.5, 162.5, 12.5, 12.5] | 100 | [12.5, 87.5, 12.5, 87.5, 12.5] |
| | 262.5 | [12.5, 12.5, 237.5, 12.5, 12.5] | 125 | [12.5, 112.5, 12.5, 112.5, 12.5] |
| | 337.5 | 12.5, 12.5, 312.5, 12.5, 12.5] | 175 | [12.5, 162.5, 12.5, 162.5, 12.5] |
| 100 | 50 | [16.66, 16.66, 16.66, 16.66, 16.66] | 33.33 | [16.66, 16.66, 16.66, 16.66, 16.66] |
| | 150 | [16.66, 16.66, 133.33, 16.66, 16.66] | 66.66 | [16.66, 49.33, 16.66, 49.33, 16.66] |
| | 250 | [16.66, 16.66, 233.33, 16.66, 16.66] | 133.33 | [16.66, 116.33, 16.66, 116.33, 16.66] |
| | 350 | [16.66, 16.66, 333.33, 16.66, 16.66] | 166.66 | [16.66, 149.33, 16.66, 149.33, 16.66] |

FIG. 8

SEISMIC DATA ACQUISITION WITH DUAL/TRIPLE SOURCES AND HEXA-SOURCE

TECHNICAL FIELD

Embodiments of the subject matter disclosed herein generally relate to methods and systems for acquiring seismic data during a marine seismic data acquisition survey, and more particularly, to mechanisms and techniques for recording a first seismic dataset with better cross-line resolution for shallow targets and at the same time, recording a second seismic dataset for deep targets.

BACKGROUND

In oil and gas exploration and exploitation, marine seismic surveys are an important tool for making drilling-related decisions. Seismic data acquired during such a survey is processed to generate a profile (i.e., an image), which is a three-dimensional approximation of the geophysical structure under the seafloor. This profile enables those trained in the field to evaluate the presence or absence of oil and/or gas reservoirs, which leads to better management of reservoir exploitation. Enhancing seismic data acquisition and processing is an ongoing process.

FIG. 1 is a vertical-plane view of a generic marine survey setup 100. A vessel 101 tows a seismic source 102 (note that, for simplicity, the source's full configuration is not shown) and streamers (only one streamer 104 is visible in this view) in a towing direction T. When the seismic source is activated, seismic energy 108 is emitted into the water and propagates into the rock formation under the seafloor 110. The seismic energy is partially reflected and partially transmitted at interfaces where the acoustic impedance changes, such as at the seafloor 110 and at an interface 112 inside the rock formation. Reflected energy 114 may be detected by sensors or receivers 106 (where a sensor is understood to mean a physical device that records seismic data and a receiver is understood to mean a unit that includes a plurality of sensors for which the signals measured by the plurality of sensors are combined and represent the signal of the receiver) carried by the streamers. A sensor may be a hydrophone, geophone and/or accelerometer. The acquired or recorded seismic dataset represents the detected energy.

As illustrated in FIG. 2, conventional marine seismic surveys 200 typically mobilize a single vessel 201 towing typically two source arrays 210 and 220 in front of a spread 206 of ten or more streamers 204. A source array 210 is understood in this document to include one or more sub-arrays (i.e., a string) 210-1 and 210-2, each sub-array including plural source elements 212. A source element 212 is typically an airgun or a cluster of airguns. A typical sub-array includes about 30 source elements 212. When a source array 210 is fired, it is typical to shoot only a subset of the source elements 212 as some source elements are kept as spares, or are simply not used. A sub-array typically contains source elements 212 with different sizes/volumes. The main reason for this is that source-elements (guns) with different volumes have different bubble periods. When they are fired simultaneously, the acoustic output from the peak from each source element will align and superimpose, while the acoustic output from the bubbles (with different periods) will cancel. The end result is an array signature (signal) with a spike like appearance, which generally is beneficial for subsurface imaging.

The total volume of a source array also normally varies. Small source arrays with a total volume less than, for example, 2,000 cu.in (cubic inch, i.e. $in^3$) may be used for imaging shallow targets, while larger source arrays with a total volume, typically more than 2,000 cu.in, normally are used for imaging deeper or long offset targets. However, with present day source array configurations it has proven difficult to acquire datasets that simultaneously provide both shallow target resolution and good deep penetration. Thus, there is a need for a new method/configuration for simultaneously acquiring both a shallow target resolution and good deep penetration.

SUMMARY

According to another embodiment, there is a method for configuring a multi-source and a hexa-source for acquiring first and second seismic datasets of a subsurface. The method includes selecting a number n of source arrays to create the multi-source; selecting a number m of sub-arrays for each source array, each sub-array having a plurality of source elements; imposing a distance D between any two adjacent source arrays of the multi-source; calculating a distance d between any two adjacent sub-arrays of a same source array so that bins associated with the first and second seismic datasets are interleaved; selecting source elements from at least six different sub-arrays of the n source arrays to create the hexa-source; and firing the multi-source to acquire the first dataset, and firing the hexa-source to acquire the second dataset.

According to another embodiment, there is a marine seismic acquisition system for acquiring first and second seismic datasets of a subsurface. The system includes a number n of source arrays that constitute a multi-source, wherein any two adjacent source arrays of the multi-source are separated by a distance D; each source array has a number m of sub-arrays, each sub-array having a plurality of source elements (i,j,A; i,j,B), wherein a distance d between any two adjacent sub-arrays of a same source array is selected so that bins associated with the first and second seismic datasets are interleaved; and a hexa-source made of selected source elements from at least six different sub-arrays of the n source arrays.

According to still another embodiment, there is a computing device for controlling a multi-source and a hexa-source to acquire first and second seismic datasets of a subsurface. The computing device includes an interface configured to receive a number n of source arrays to create the multi-source and to receive a number m of sub-arrays for each source array, each sub-array having a plurality of source elements and a processor connected to the interface. The processor is configured to apply a distance D between any two adjacent source arrays of the multi-source, calculate a distance d between any two adjacent sub-arrays of a same source array so that bins associated with the first and second seismic datasets are interleaved, select source elements from at least six different sub-arrays to create the hexa-source, and fire the multi-source to acquire the first dataset, and firing the hexa-source to acquire the second dataset.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 8 illustrates possible configurations for the sub-arrays forming the source arrays for obtaining interleaved bins;

DETAILED DESCRIPTION

Figure 1:
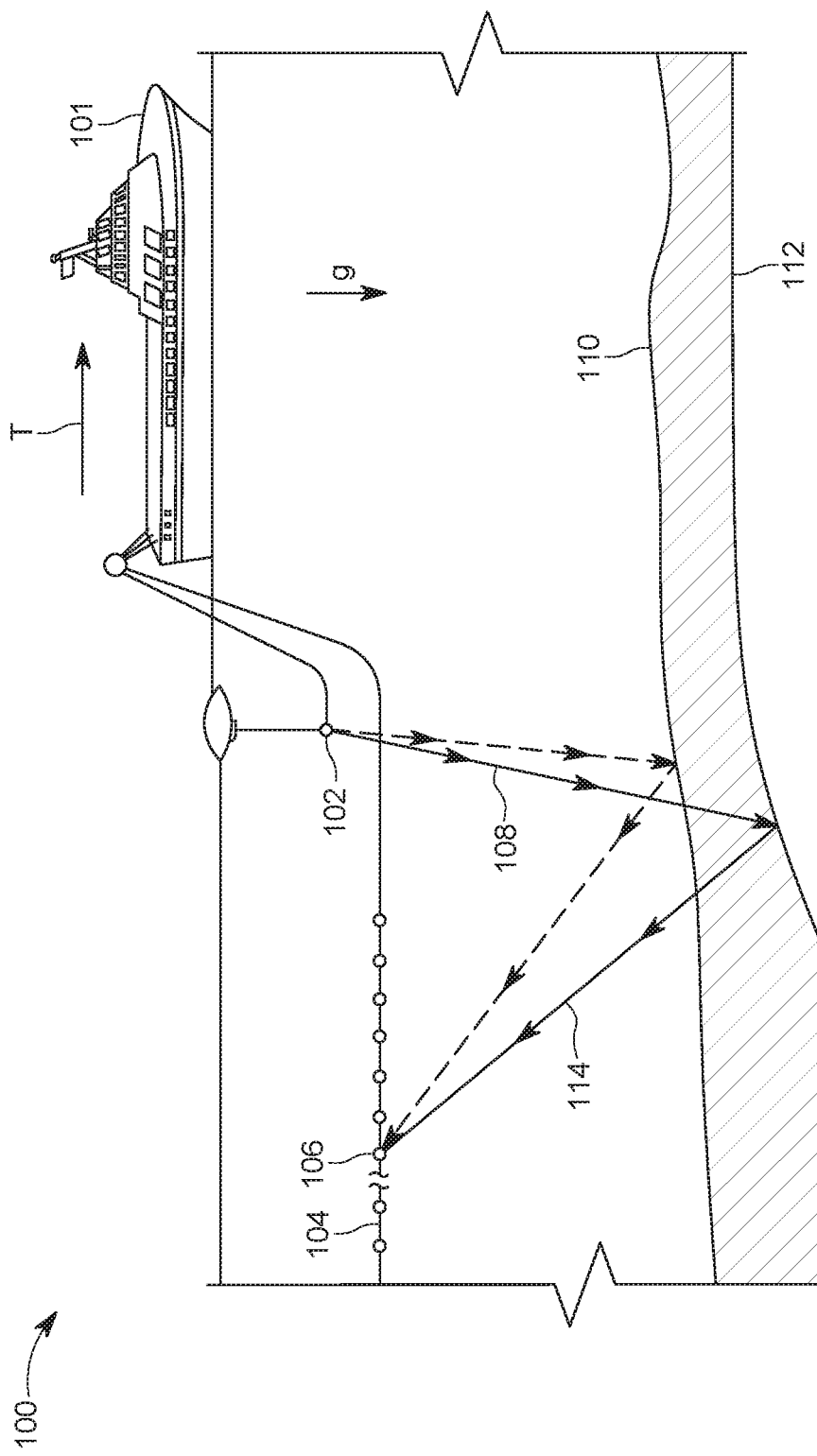
FIG. 1 illustrates a generic marine seismic survey system.
Figure 2:
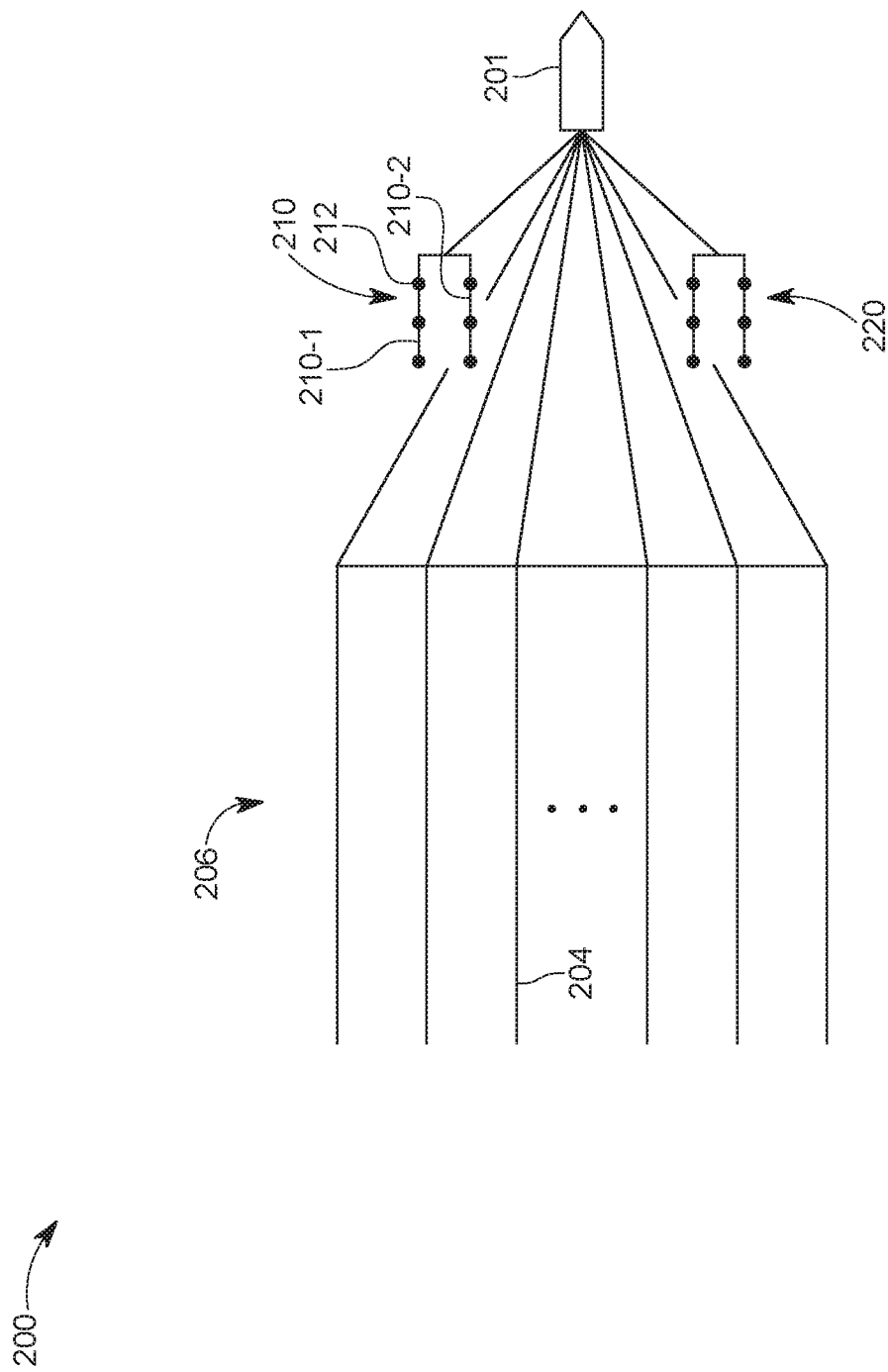
FIG. 2 illustrates a marine seismic survey system having two source arrays, each source array having corresponding sub-arrays.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a marine seismic data acquisition system having two or three source arrays located ahead of the streamers. However, the current inventive concepts may be used for other types of surveys, such as surveys having source arrays located directly above the streamers, to the side of the streamers, behind the streamers, or source arrays that are towed by drones, autonomous underwater vehicles, unmanned survey vessel, or a combination of them, of for more than three source arrays.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments described in this section, a vessel tows either two or three source arrays. The two or three source arrays are called herein the dual-source or triple-source, respectively. A generic name for these sources is a multi-source. Typically, a dual-source is made up of two source arrays, each having three source-strings (or sub-arrays) while a triple-source is made up of three source arrays, each having two source strings (or sub-arrays). In both cases, the total number of source strings is six. The source arrays are towed in a wide tow configuration. The source arrays are fired in two different modes, a straight mode and a hexa mode. The straight mode has a first set of the source elements of the two or three source arrays being fired simultaneously with an aim of detecting/imaging deep targets, while a second set of the source elements of the two or three source arrays are being fired more often than the first set, and with an aim of detecting/imaging shallow targets in the subsurface. The first set may be the same as the second set. In one application, the first set is different from the second set, with the first and second sets having a subset of source elements in common. In still another application, the first set is different from the second set and the two sets have no source element in common. The hexa mode uses source elements from different sub-arrays, which belong to different source arrays. The number of sub-arrays involved in a hexa mode is at least six. Each sub-array of the six sub-arrays of the hexa-source contributes with at least one source element. The sub-arrays can be selected from any number of source arrays. The two seismic datasets (one collected in the straight mode and the other one collected in the hexa mode) are collected with a marine seismic survey system during a single pass of the zone of interest. A shooting pattern for actuating the source elements in the straight mode and the hexa mode may include a sequential shooting of the source arrays, or a flip-flop shooting.

Figure 3:
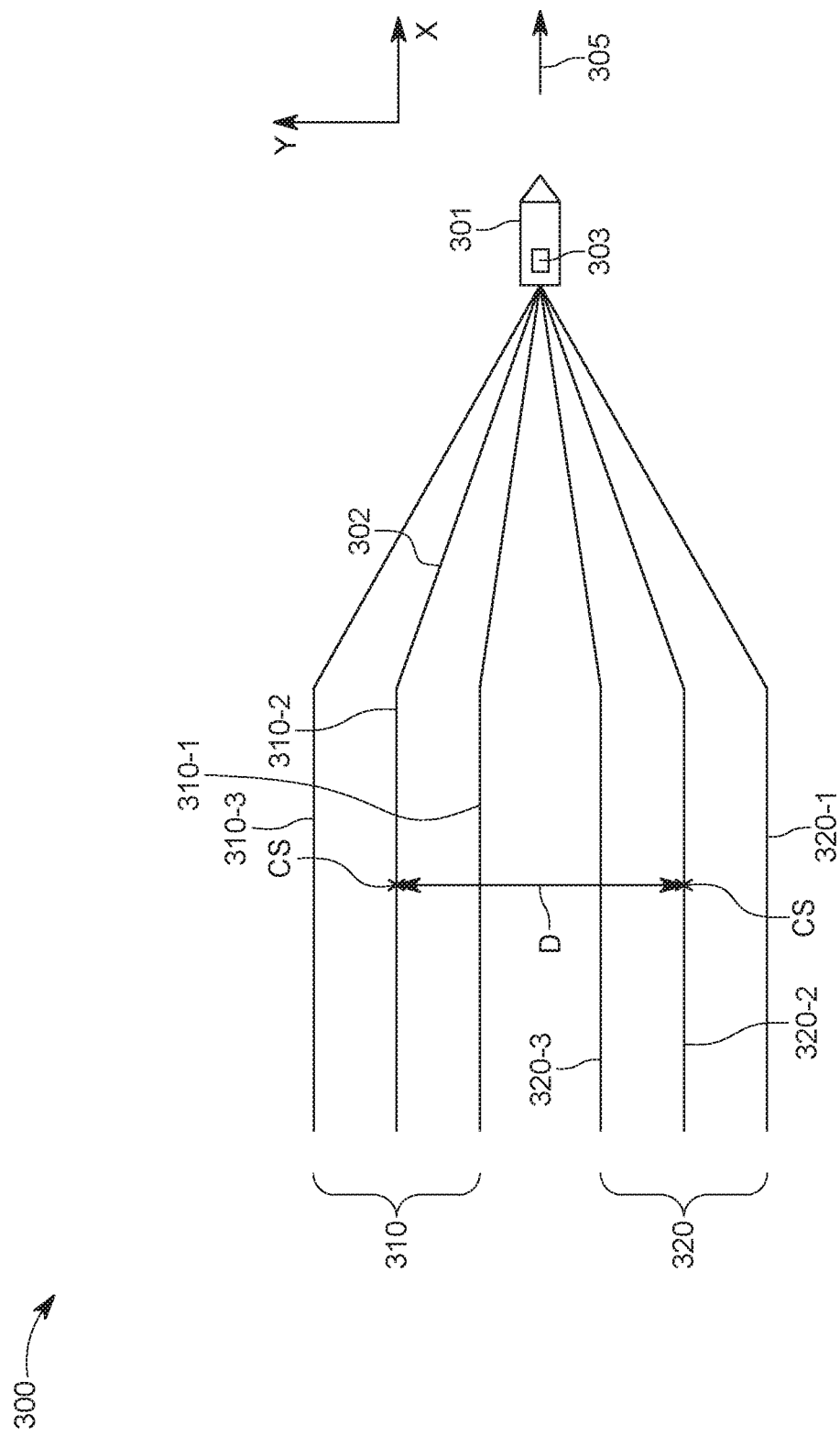
FIG. 3 illustrates a center of a source array.

For this application, a wide-tow configuration is defined as having at least 100 m separation between the outer most source arrays 310 and 320 of the two or three source arrays, as illustrated in FIG. 3. FIG. 3 shows a system 300 that includes a vessel 301 towing two source arrays 310 and 320. Vessel 301 includes a controller 303 that controls a firing of the source arrays. Source array 310 has three sub-arrays 310-1 to 310-3. Source array 320 has a similar configuration as source array 310. Each sub-array may be connected to the vessel 301 with a corresponding umbilical 302. When measuring a distance between the two source arrays 310 and 320, because of their geometrical spread, a center of source CS is defined for each source array. The center of source CS may be defined as a geometrical center of the source array, in which case the volume of each source element is irrelevant, or, as a center of mass of the source array, in which case the volume of each source element is taken into account. For the configuration shown in FIG. 3, the distance D between the two center of sources CS is at least 100 m. Note that the distance D is measured along the cross-line direction Y, while the vessel advances along a sail path 305 along the inline direction X, and the inline direction is perpendicular to the cross-line direction.

Figure 4:
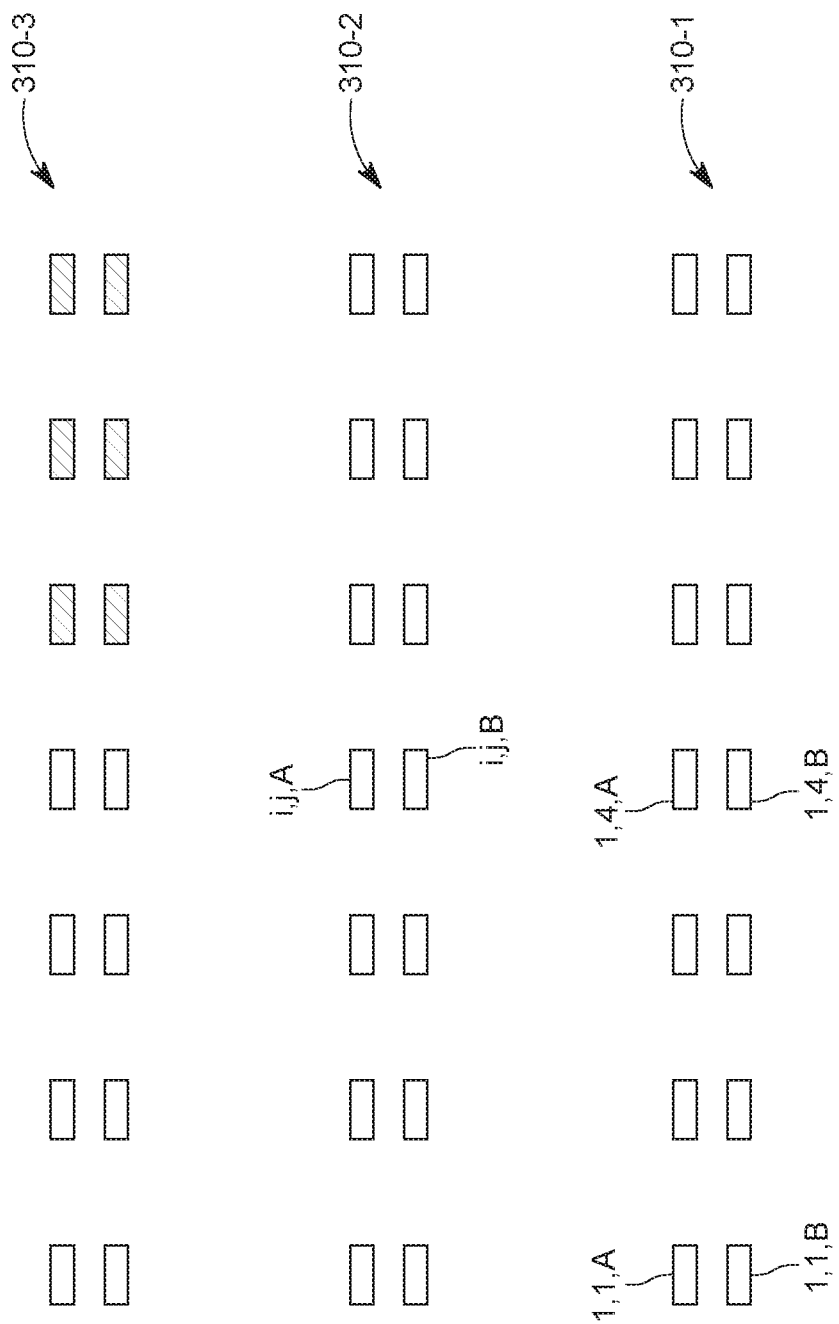
FIG. 4 illustrates the source elements of a source array.

According to the embodiment illustrated in FIG. 3, the straight mode uses source elements from each sub-array of the first source array 310 and the second source array 320 to collect the seismic data. Each source array in this embodiment has at least three sub-arrays. FIG. 4 illustrates a bird view of the first source array 310 and the placement of the source elements along the sub-arrays 310-1 to 310-3. The source elements are labeled in this figure with three parameters, "i", "j", and A or B. The first parameter "i" describes the sub-array in the source array (in this example i can be 1, 2, or 3). The second parameter "j" describes the position of the source element along a given sub-array (in this example j can typically be an integer between 1 and 7). The third parameter describes one of the source element in a cluster of source elements located at a given sub-array i and a position j along that sub-array. This means, that in sub-array 1, at position 4, there could be two source elements A and B. Note that a position i, j may have only one source element. In one application, the depth of the source elements in the same cluster is the same. In another application, the depth of all the source elements for the entire source array is the same. However, in still another application, the sources element may be located at different depths. A source element may be an air gun or a vibratory source, or water gun, or any other known source of sound waves.

The volume of the source elements is not the same for a given sub-array. For example, as illustrated in FIG. 4, source elements having i=3 and j larger than 4 each has a volume smaller than 200 cu.in and the remaining of the source elements in this sub-array include at least some guns with volume larger than 200 cu.in. If the source element is an airgun, a smaller volume airgun can be recharged much faster than a larger airgun, which means that the smaller volume airguns (and therefore smaller volume sources) can be fired at a higher rate than the large volume airguns. This feature is advantageous as the hexa-source is fired more often than the first and second source arrays 310 and 320.

Figure 5:
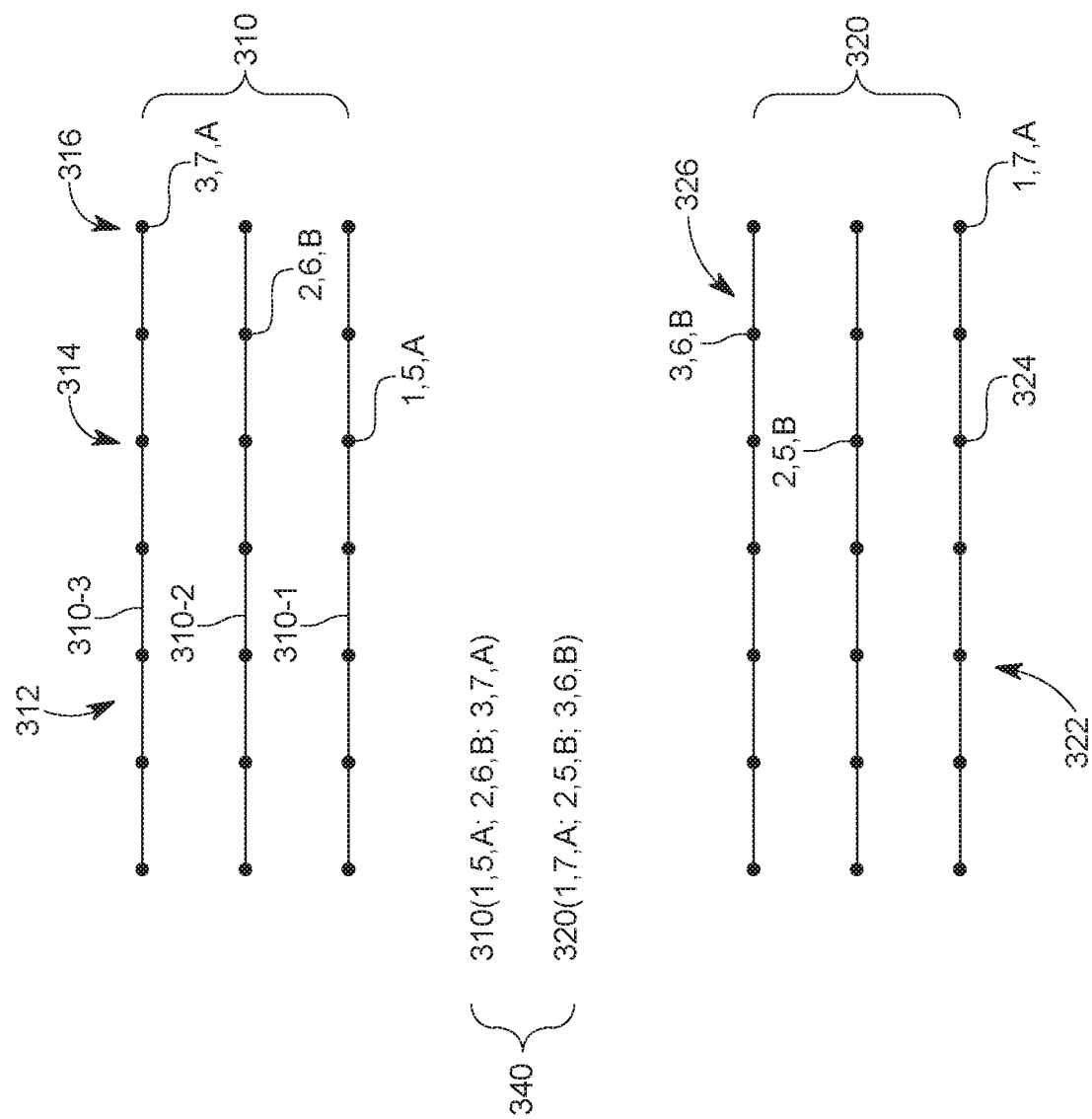
FIG. 5 illustrates the source elements of a dual-source and a hexa-source.

The hexa-source 340 is made up of source elements that belong to the first and second source arrays 310 and 320. For example, as illustrated in FIG. 5, the hexa-source 340 includes one source element from each sub-array of each source array 310 and 320. More specifically, the hexa-source 340 can for example include source elements (1,5,A; 2,6,B; 3,7,A) from the first source array 310 and source elements (1,7,A; 2,5,B; 3,6,B) from the source array 320. Note that a hexa-source needs to include, at a minimum, one source element from each of six different sub-arrays, where at least two sub-arrays belong to different source arrays. However, this definition does not prevent the hexa-source 340 to have more source elements from a same sub-array, or source elements from more than six sub-arrays. In other words, a hexa-source is defined herein to include source elements from at least six different sub-arrays.

When the first source array 310 is fired during a seismic survey, there is no requirement that all the source elements i,j,A or B are fired. Most of time, a subset of the source elements i,jA and i,j,B is fired as some of the source elements are spare elements. For example, for a sub-array having 7 positions as in FIGS. 3 and 4, and two source elements per position, i.e., about 14 source elements per sub-array, only about 10 source elements are fired during a traditional seismic survey acquisition. In one application, the hexa-source takes advantage of those unused positions. In still another application, the hexa-source may use some of the source elements that are also used by the first or second source arrays.

Returning to FIG. 5, source array 310 is considered to have a set 312 of source elements i,j,A and i,j,B, where i is 1, 2, and 3, and j is any number from 1 to 7. Note that for a given position j, there is no need to have two source elements A and B. A single source element may be present at each position along the sub-array. Element B may be non-existing or may be a spare that only is activated if element A should fail. Alternatively, more than two source elements may be present at each position along the sub-array. When the first source array 310 is fired, a subset 314 of the set 312 is usually selected and fired, where the subset 314 can include any number of source elements from the set 312. Similarly, for the second source array 320, which includes a set 322 of source elements, only a subset 324 of the set 322 of source elements is fired when the source array 320 is fired.

The hexa-source 340 may include source elements from a subset 316 of the set 312 and a subset 326 of the set 322. The subset 316 may overlap with the subset 314, or they may share no source element. Using the language of the set theory, in one application, an intersection of the subsets 314 and 316 is zero. For this application, a union of the two subsets 314 and 316 may be exactly set 312 or less than the set 312. Similarly, for the second source array 320, in one application, an intersection of the subsets 324 and 326 is zero. For this application, a union of the two subsets 324 and 326 may be exactly the set 322 or less than the set 322. Any combination of the subsets 316 and 326 is possible for the hexa-source.

Figure 6A:
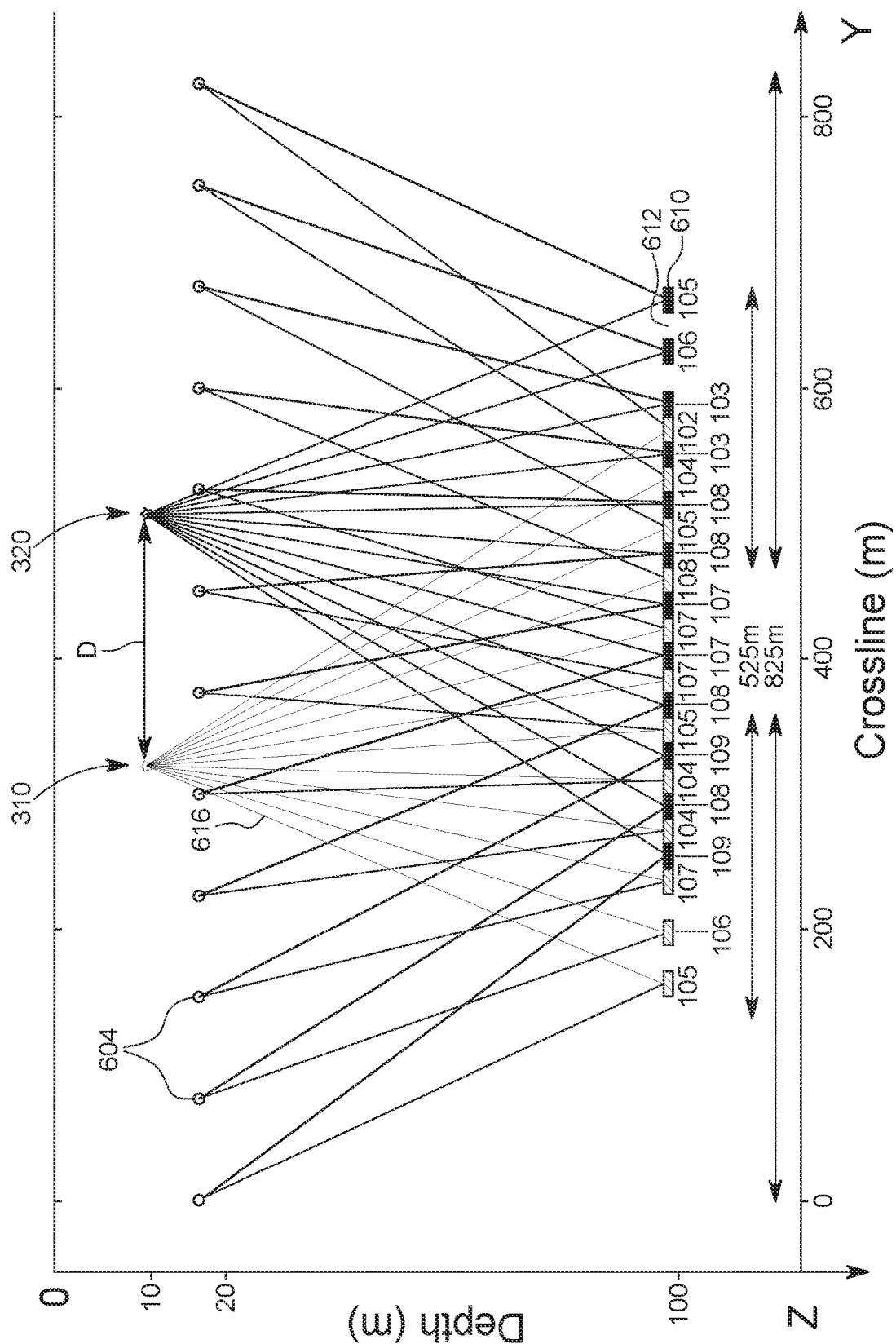
FIG. 6A illustrates the interleaved bins corresponding to a seismic survey having two source arrays when the two source arrays are fired.
Figure 6B:
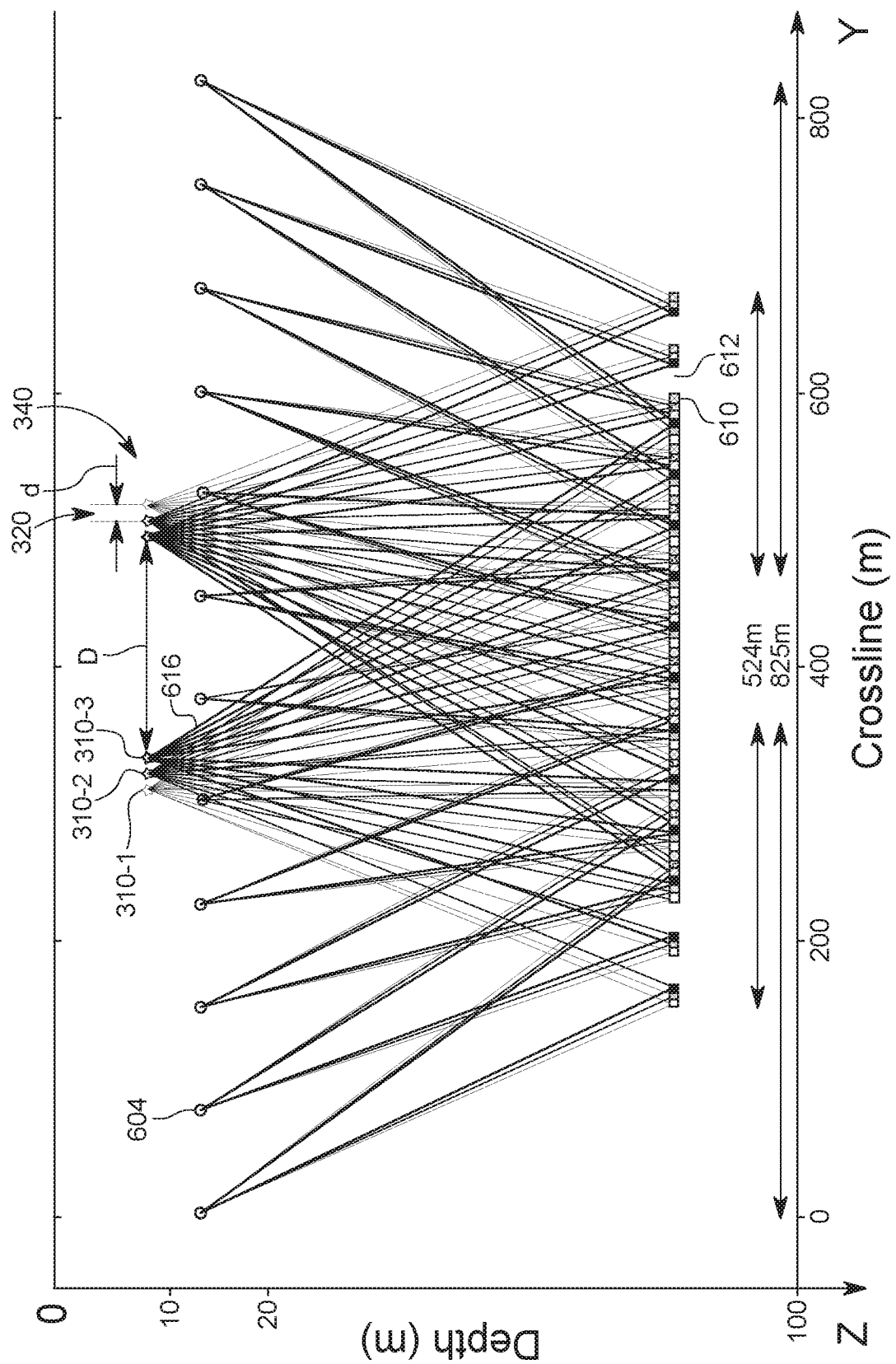
FIG. 6B shows the still interleaved bins when a hexa-source is fired for the same system.
Figure 6C:
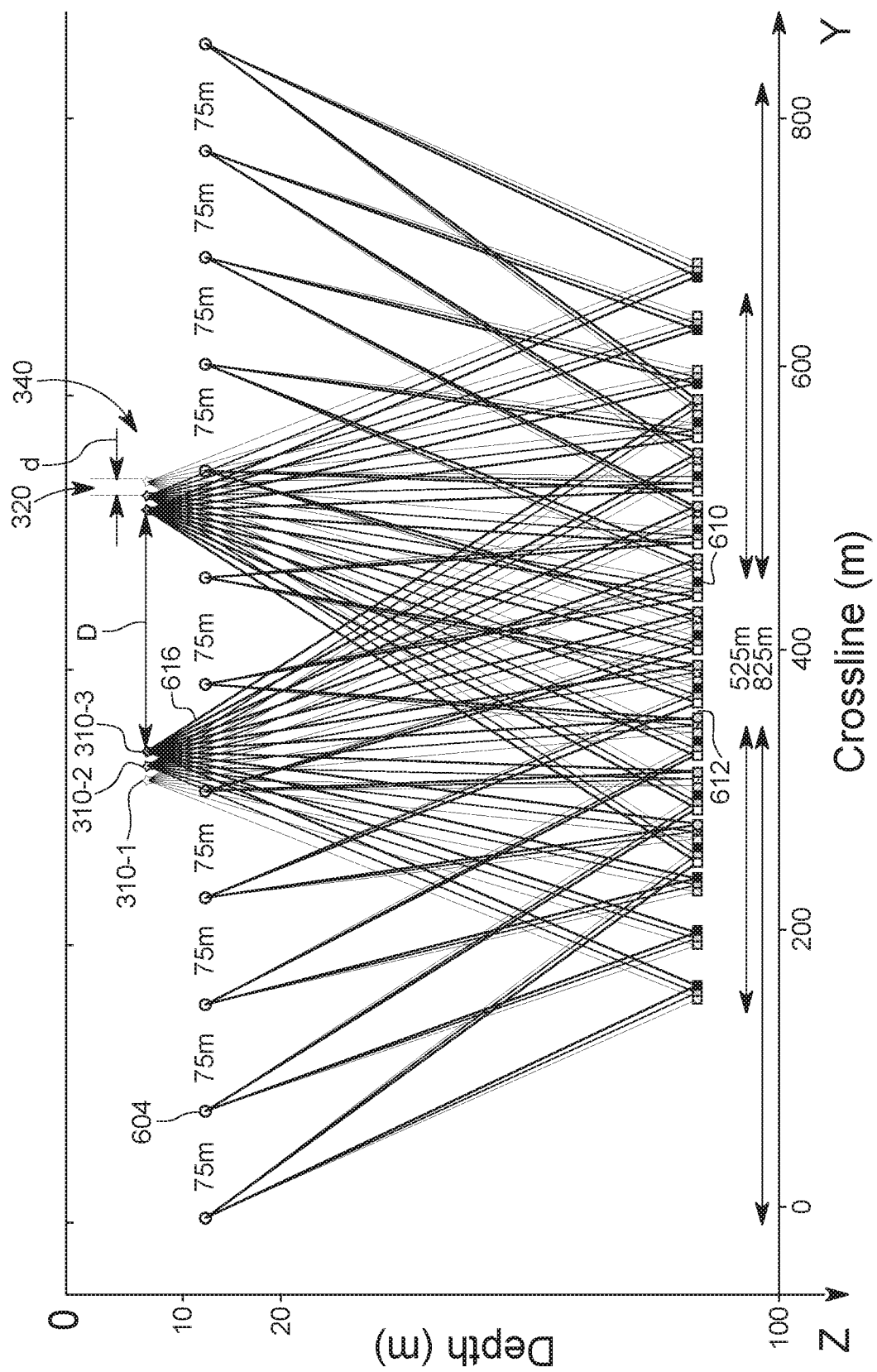
FIG. 6C shows the same system, but with a distance between the source elements of the hexa-source being reduced.

A specific example of a two source arrays and one hexa-source is now discussed with regard to FIGS. 6A to 6C. FIG. 6A shows the two source arrays 310 and 320 represented as a respective point located at the center CS of the source array. In other words, each source array is represented as a point located at its CS point. A distance D between the two CS points is 187.5 m in this example. The streamers 604 are represented as points because the figure is a cross-section along the cross-line direction Y and the depth direction Z. There are 12 streamers in this embodiment that are separated by a distance of 75 m. Sound waves 616 emitted by each source array are schematically illustrated being reflected at the ocean bottom, and then reaching the streamers. The natural bin 610 width along the cross-line direction is 18.75 m in this embodiment, which is given by dividing the streamer separation (75 m) to twice the number of source arrays (2×2) of the acquisition system.

A bin is related to the resolution of the seismic image, which is a function of the trace spacing within the data volume. As the separation between adjacent traces decreases, the resolution of the image increases. At the conclusion of data processing, the area spanned by a seismic image is divided into a grid of small, abutted subareas, called bins. Each trace in a seismic data volume is positioned so that it passes vertically through the midpoint of a bin. A bin has lateral dimensions of $\Delta x$ and $\Delta y$. The horizontal separations between adjacent processed traces in the data volume are also $\Delta x$ and $\Delta y$. The bins can be square or rectangular, depending on an interpreter's preferences and the acquisition layout. The dimension of the trace spacing in a given direction across a seismic image is the same as the horizontal dimension of the bin in that direction. As a result, the resolution of the image is controlled by the areal size of the bin. The imaging objective dictates how small a bin should be. Smaller bins are required if the resolution of small stratigraphic features is the primary imaging requirement. All the traces that fall into a same bin are usually stacked together during processing.

For the configuration shown in FIG. 6A, the approximate fold for each bin is listed at the bottom of the figure. The fold indicates how many traces are located in a bin. Note that while the outer bins are separated by empty spaces 612, the central bins located below the inner streamers are interleaved with no empty spaces, i.e., they are perfectly interleaved. The term "interleaved" is used in this application to mean that there is no empty space between adjacent central bins under ideal conditions. The term "ideal conditions" should be construed to mean that there are no currents, winds, or equipment malfunction that introduce any deviation to the movement of the streamers and/or sources and/or vessel. In other words, the bins are interleaved at the time when the sizes of the bins are theoretically estimated prior to the seismic survey. However, in practice, the various components of a seismic survey system always experience some deviation from their theoretical path (e.g., streamers do not follow their path due to water currents, the vessel does not follow its sail line due to winds, etc.), which likely make the bins to not be perfectly interleaved.

FIG. 6B shows the same configuration of the two source arrays, but now each sub-array of the source arrays is also shown. This is so because this figure illustrates the sound waves 616 generated by the hexa-source 340 for the same streamer configuration. The natural bin is 6.25 m for this case as two sub-arrays of the same source array are separated by a distance d=12.5 m and a distance D between two adjacent sub-arrays from the two source arrays is about 162 m. Note that the bins 610 for each source element are smaller than for the previous case, but still interleaved, i.e., there are no empty spaces 612 between the central bins 610.

FIG. 6C shows the six sub-arrays of FIG. 6B, but a distance d between adjacent sub-arrays of the same source array are reduced from 12.5 to 10 m and the distance D is reduced to 172 m. Because of the reduced distance d, there are now empty spaces 612 between the central bins 610, which are located below the inner streamers 604. The interleaving for this case is not perfect, but still good for processing purposes. According to the research of the inventor, if the distance d between adjacent sub-arrays of the same source array is reduced by up to 30% from the value (i.e., 12.5) that produces perfect interleaving, the obtained seismic data is still adequate for high quality seismic imaging.

Figure 7A:
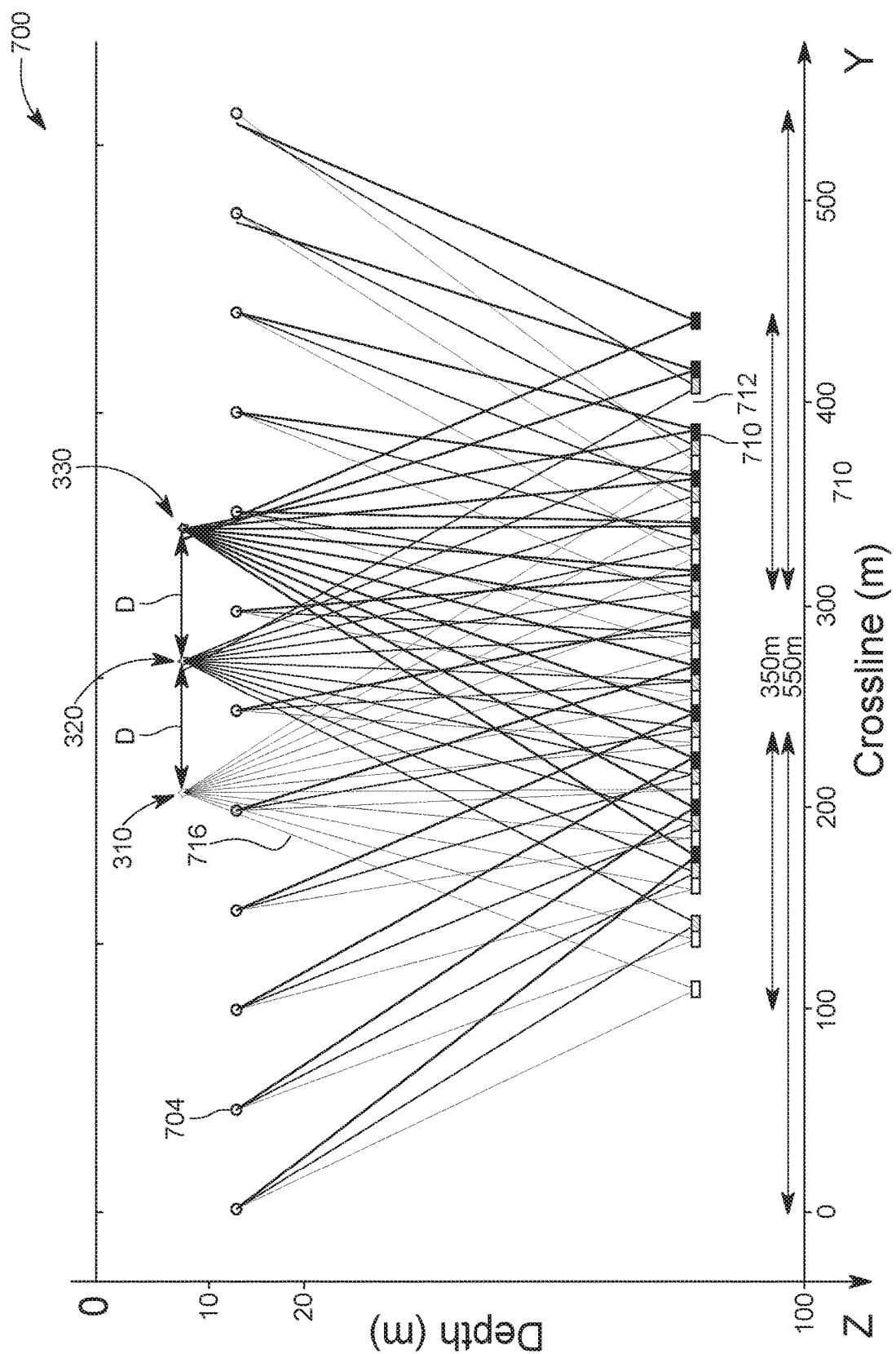
FIG. 7A illustrates the interleaved bins corresponding to a seismic survey having three source arrays when the three source arrays are fired and FIG. 7B shows the still interleaved bins when a hexa-source is fired for the same system.
Figure 7B:
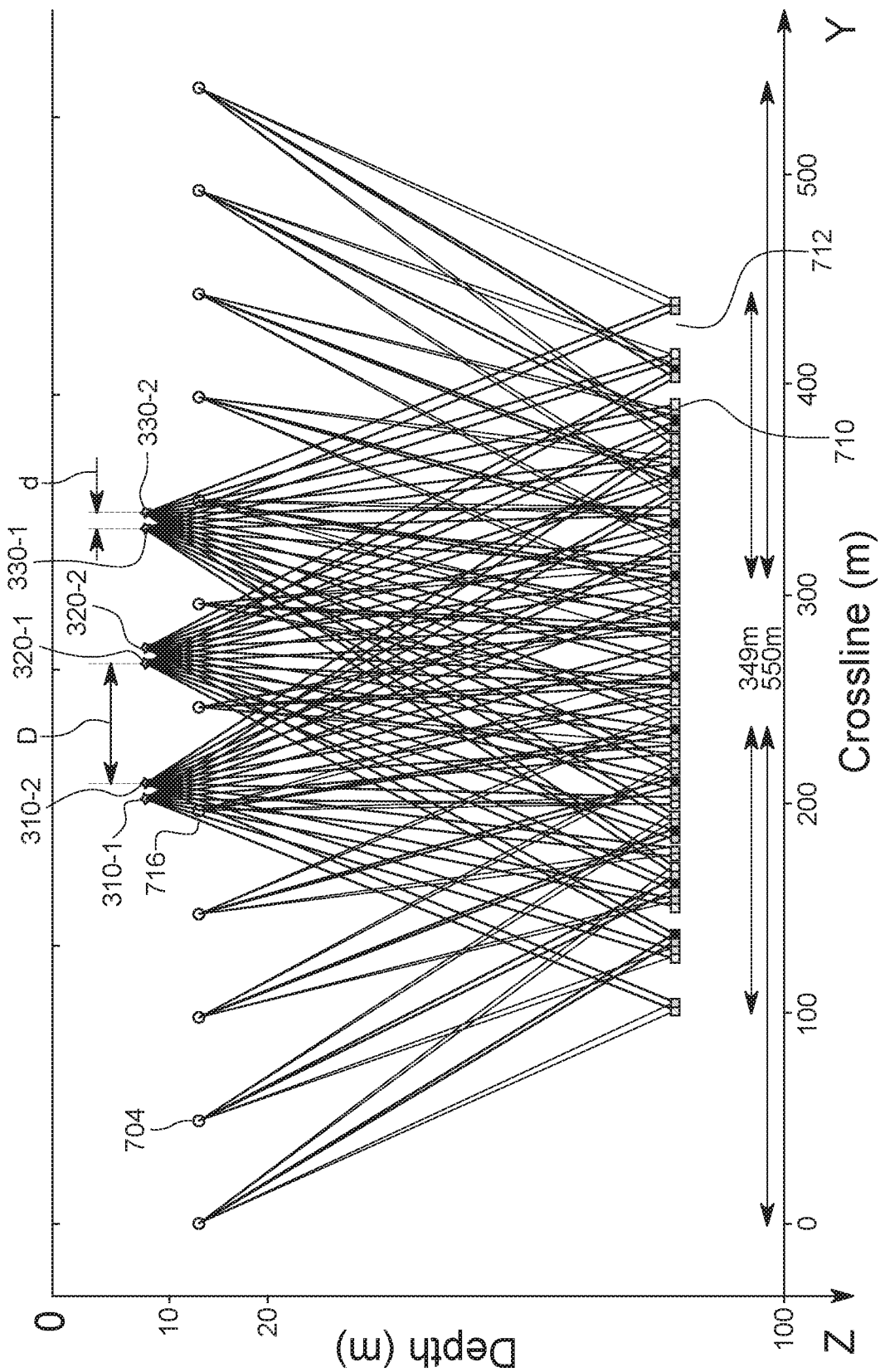

An embodiment that describes a combination of (i) a three-source array and (ii) a hexa-source configuration is now discussed with regard to FIGS. 7A and 7B. FIG. 7A shows a marine seismic acquisition system 700 that includes three source arrays 310, 320, and 330. A cross-line distance D between the CSs of two adjacent source arrays is 66.68 m along the cross-line direction Y in this embodiment. Each source array emits sound waves 716, which, after being bounced off from the ocean bottom or a given interface inside the subsurface of the earth, are recorded by a corresponding sensor on a streamer 704. The bins 710's width is about 8.33 m along the cross-line direction for this embodiment. Note that the specific numbers presented in this and other embodiments should not be construed as limiting the novel concepts. For this embodiment, it can be seen from FIG. 7A that the interleaving of the bins 710 is perfect, i.e., there are no spaces 710 between the central bins.

The bins 710 obtained when the hexa-source 340 is fired are shown in FIG. 7B. Note that in this embodiment each source array has only two sub-arrays, i.e., source array 310 has sub-arrays 310-1 and 310-2, source array 320 has sub-arrays 320-1 and 320-2, and source array 330 has sub-arrays 330-1 and 330-2. A distance d between adjacent sub-arrays of the same source array is about 8.33 m and a distance D between adjacent sub-arrays belonging to different source arrays is about 58 m. The size of the bin 710 is now about 4.17 m and no empty spaces 712 can be observed between adjacent central bines. This means that the bins for the hexa-source are perfectly interleaved.

FIG. 8 illustrates various configurations of (1) dual-source array—hexa-source seismic acquisition systems and (2) triple-source array—hexa-source seismic acquisition systems that generate ideal bin interleaving for ideal conditions (i.e., no currents, winds, or any disturbance to the seismic system). These configurations are calculated for various streamer separations, which are indicated in the first column. The second column indicates the distance D between CSs for a dual-source array and the third column indicates the distance d between adjacent sub-arrays for the hexa-source. The fourth column indicates the distance D for a three-source array (note that some configurations in this column do not respect the wide tow condition discussed above. However, these configurations achieve a perfect or substantially perfect interleaving of the bins and are desirable) and the last column indicates the distance d between adjacent sub-arrays for the hexa-source. Some of the geophysically most appealing configurations with wide tow sources are in bold.

The distance D in the second column has been calculated using the formula $Dy_{dual}=N*str\_sep/2$, where $Dy_{dual}=D$, N is a natural number different from zero, and str_sep is the distance between two adjacent streamers. The distance D in the fourth column has been calculated using the formula $Dy_{triple}=N*str\_sep/3$, where $Dy_{triple}$ is D. The distance d in the third column is calculated using the formula $Dy_{dual-hexa}=[A, A, A+N*str\_sep, A, A]$ or $[A, A, Dy_{dual}+str\_sep/3, A, A]$, where A is defined as $A=str\_sep/6$, and N is any natural number. The distance d in the fifth column is calculated using the formula $Dy_{triple-hexa}=[A, A+N*str\_sep/3, A, A+N*str\_sep/3, A]$ or $[A, Dy_{triple}-(str\_sep/6), A, Dy_{triple}-(str\_sep/6), A]$, where A is defined as $A=str\_sep/6$, and N is any natural number.

To obtain perfectly interleaved binning for a dual or a triple source array (bold solutions in FIG. 8), only certain source array separations D, related to the chosen streamer separation, are possible. These separations are given by $Dy_{dual}=N*str\_sep/2$ and $Dy_{triple}=N*str\_sep/3$. To find the sub-array separations d that simultaneously support both a dual/triple source array and a hexa-source, the $Dy_{dual-hexa}$ and $Dy_{triple-hexa}$ defined above need to be used.

Figure 9:
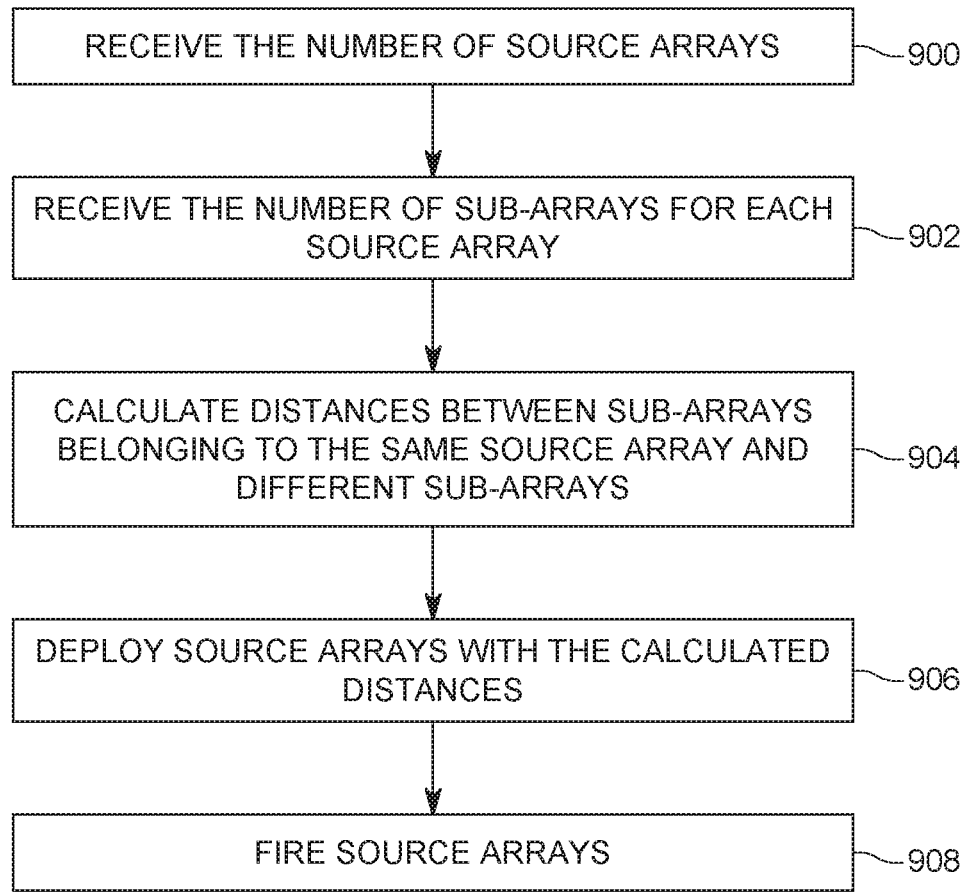
FIG. 9 is a flowchart of a method for determining the distances between the sub-arrays of plural source arrays for achieving interleaved bins.

Thus, according to a method discussed with regard to FIG. 9, in order to design a seismic acquisition system that achieves perfect or near perfect interleaving (i.e., within 30% of the separation that is responsible for a perfect interleaving), the method receives in step 900 a number "n" of source arrays to be towed by a vessel. The number "n" can be 2 or 3 in this embodiment. Then, in step 902, the method receives the number "m" of sub-arrays that form each source array. The number m of sub-arrays may be 2 or larger. In step 904, the method calculates the distances d between adjacent sub-arrays of a same source array and distances D between adjacent sub-arrays of two different source arrays such that bins corresponding to shooting the source arrays interleave perfectly. The distances d and/or D may also be calculated in this step to be within a range of +/−30% of the corresponding distances for obtaining the bins to interleave perfectly. In step 906, the source arrays are deployed behind a vessel with distances d and D and in step 908 the source arrays are fired so that dual/triple source arrays fire separately from a hexa-source. The hexa-source is configured as discussed in the previous embodiments.

Figure 10:
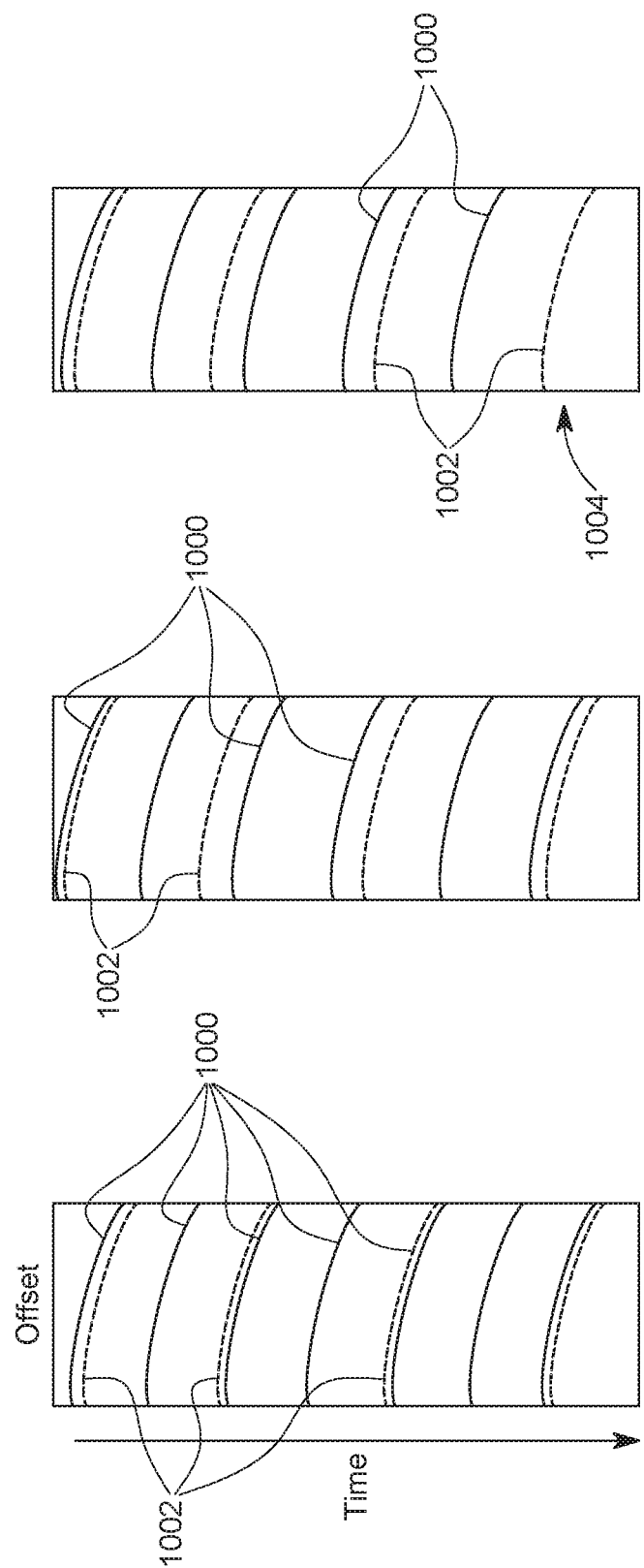
FIGS. 10A-10C illustrate shot gathers that correspond to different firing strategies of the sources.

In terms of firing these sources, there are a couple of possibilities that are now discussed. According to a first embodiment, the shot point interval (SPI) for the hexa-source is selected to be 4.16 m while the SPI for the dual/triple source array is double the SPI of the hexa-source, i.e., 8.33 m. A shot point interval is considered to be a distance, along the inline direction, between a first shooting of a given source and a consecutive or sequential second shooting of the neighboring source. Dithers may be added to both distances. With this configuration, a shot gather looks as illustrated in FIG. 10A and includes signals 1000 generated by the hexa-source and signals 1002 generated by the dual/triple source arrays. This configuration achieves regular fold for the bins and blending noise coming in on every second shot.

According to another embodiment, it is possible to fire the hexa-source with an SPI which is not half of the SPI of the dual/triple source array. For example, the SPI for the hexa source may be 5 m+/−dither and the SPI for the dual/triple source array is 8.33 m+/−dither. Other values may be used. For this configuration, which is illustrated in FIG. 10B, the shot gather shows a varying distance between the hexa-source signal 1000 and the dual/triple source array signal 1002, which produces irregular fold. However, for this case, different from the previous case, the blending noise (i.e., the signal from the second source seen when data from the first source is aligned—and sorted to, for example, the common offset domain) is spread out, which makes this firing method attractive for processing purposes.

According to still another embodiment, it is possible to fire the hexa-source with an SPI which is not half of the SPI of the dual/triple source array, but also skipping some hexa-source shots. For example, the SPI for the hexa-source may be 5 m+/−dither and the SPI for the dual/triple source array is 8.33 m+/−dither. Other values may be used. For this configuration, which is illustrated in FIG. 10C, the shot gather shows a varying distance between the hexa-source signal 1000 and the dual/triple source array signal 1002, which produces irregular fold. Further, a hexa-source signal 1004 is shown missing at the bottom of the figure. For this case, similar to the previous case, the fold is irregular and the blending noise is spread out.

Still another strategy for firing the multi-source arrays and the hexa-source is now discussed. According to this embodiment, the hexa-source is assumed to have an SPI of 8.33 m flip to flop. After N firings of the hexa-source (e.g., N=6, SPI=50 m flip to flip), the multi-source array is shot once. Then, this cycle repeats, with the hexa-source being shot N consecutive times before the multi-source array is shot again. While N has been chosen in this embodiment to be 6, other values may be used. In one variation of this embodiment, the hexa-source is shot at positions 1, 2, 3, 4, 5, 6, then the multi-source is shot with configuration A, then the hexa-source is shot again at positions 1, 2, 3, 4, 5, 6 and then the multi-source is shot with configuration B. Then, this cycle is repeated along the sail line. In this embodiment, configuration A includes three sub-arrays (e.g., 1, 2, 3) and configuration B includes different sub-arrays (e.g., 4, 5, 6). This means that the make-up, in terms of the source elements and/or sub-arrays, of the multi-source can change from one firing position (A) to the next firing position (B). In this way, this embodiment ensures good cross-line sampling from the hexa-source and good penetration from the multi-source.

Implementation of the embodiments discussed above require no investment in further hardware as the existing source elements are used for creating the dual/triple-source arrays and the hexa-source. Also, these embodiments do not require a drastic change in the procedures for deploying and retrieving the source arrays from the water. The dual/triple source dataset and the hexa-source dataset may be combined into a single volume. In one application, the high resolution water-bottom data from the hexa-source may be used to create a very accurate multiple-model for the dual/triple-source data, and thus, improve demultiple workflows.

The dual/triple-source dataset and the hexa-source dataset may be acquired simultaneously as discussed above with regard to FIGS. 10A to 10C. Each of this dataset has interleaved binning, either perfectly or nearly perfect. Source elements from at least six different sub-arrays, belonging to plural source arrays, are used for generating the sound waves. In one embodiment, some source elements are used for both the dual/triple-source and the hexa-source. Other combinations are possible as previously discussed. The plural source arrays are towed by a single vessel, manned or unmanned. In one application, the plural source arrays that are used to form the dual/triple-source and the hexa-source are towed by different vessels. As also previously discussed, to allow for best possible deblending, the dual/triple-source has an SPI that is not a multiple of the SPI of the hexa-source. In this way, the noise is spread out, which is advantageous when processing to remove it. In one application, the hexa-source is fired more often than the dual/triple-source. Note that all these features can be mixed and matched as desired for a given seismic acquisition system.

While the dual/triple and hexa-sources can be fired with given SPI, it is also possible to add jitters the some or all shot points. A jitter may be in the range of +/−100 to 500 ms. The dual/triple and hexa-sources are towed in a wide mode, i.e., with a distance D of at least 100 m between center of sources. While the distances D and d showed in FIG. 8 were calculated for a perfect binning, the embodiments discussed above are also applicable for not such a perfect binning, i.e., distances D' and d' within 30% of the ideal distances D and d may also be used for the dual/triple and hexa-sources.

Further, in one embodiment, it is possible to have the source elements belonging to the dual/triple-source positioned at a first depth H1 relative to the water surface and the source elements of the hexa-source positioned at a second depth H2 relative to the water surface. In one application, the first depth H1 is larger than the second depth H2. Furthermore, some traditional source arrays carry spare source elements beside the active source elements. The spare source elements are used only if the active source element fails. In this application, the spare source elements are used as active source elements even if the traditional active source elements do not fail and the spare source element can be part of either the dual/triple-source, or the hexa-source, or both.

Although the previous embodiments discussed using source arrays having two or three sub-arrays, those embodiments are also applicable to source arrays having more sub-arrays, for example, 8 or 9, so that the hexa-source has source elements from more than 6 sub-arrays. Further, more than two or three source arrays may be used. For example, a quad source may be used to implement the embodiments discussed above. The hexa-source dataset may be used to create a water bottom model that is used for the de-multiple workflow on the dual/triple source dataset.

Figure 11:
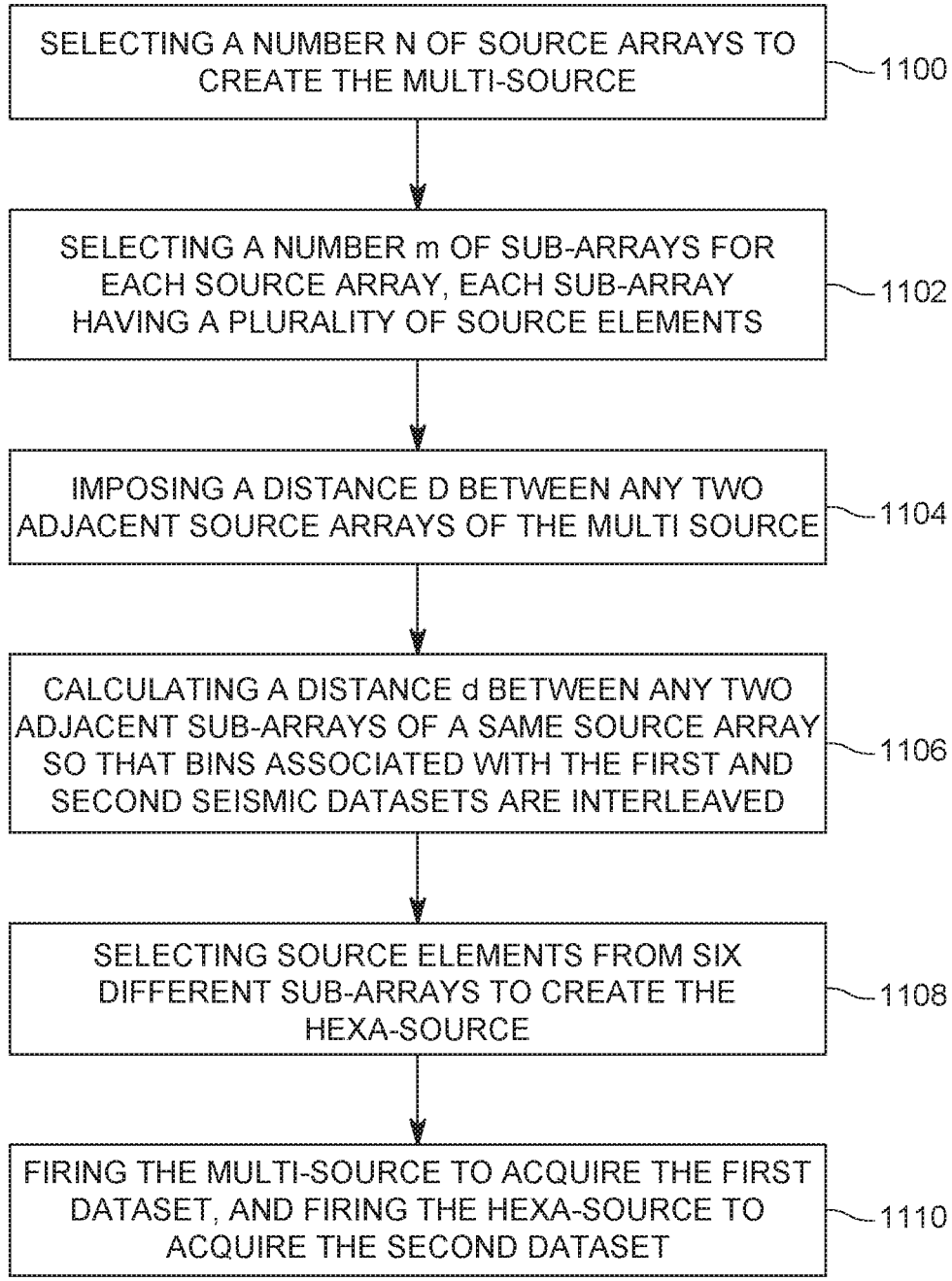
FIG. 11 is a flowchart of a method for acquiring two datasets with a multi-source and a hexa-source.

The embodiments discussed above mainly refer to a dual or triple source. However, as previously mentioned, more than 3 source arrays may be used. A method that configures a multi-source and a hexa-source for acquiring two datasets of a same subsurface of the earth is now discussed with regard to FIG. 11. The method includes a step 1100 of selecting a number n of source arrays to create the multi-source, a step 1102 of selecting a number m of sub-arrays for each source array, each sub-array having a plurality of source elements, a step 1104 of imposing a distance D between any two adjacent source arrays of the multi-source, a step 1106 of calculating a distance d between any two adjacent sub-arrays of a same source array so that bins associated with the first and second seismic datasets are interleaved, a step 1108 of selecting source elements from six different sub-arrays to create the hexa-source, and a step 1110 of firing the multi-source to acquire the first dataset, and firing the hexa-source to acquire the second dataset.

Figure 12:
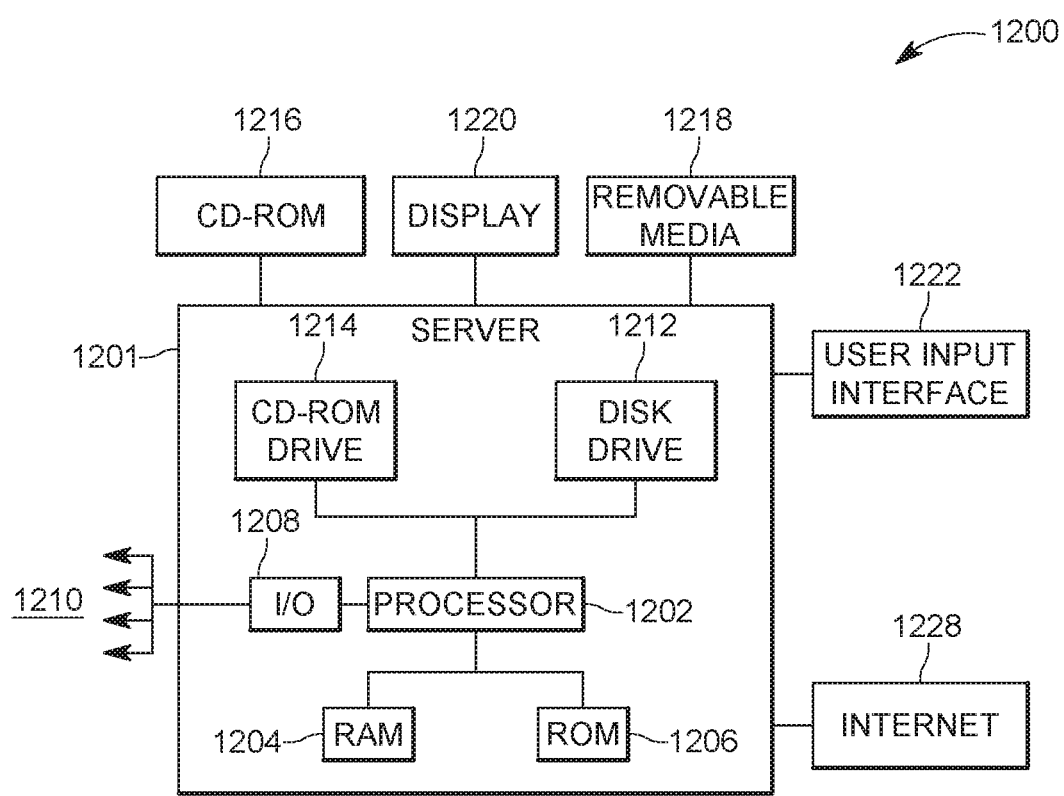
FIG. 12 is a schematic of a computing device in which the methods and processes discussed herein can be implemented.

The above-discussed procedures and methods may be implemented in a computing device as illustrated in FIG. 12. Hardware, firmware, software or a combination thereof may be used to perform the various steps and operations described herein.

Computing device 1200 (which may represent global controller 303) suitable for performing the activities described in the embodiments may include a server 1201. Such a server 1201 may include a central processor (CPU) 1202 coupled to a random access memory (RAM) 1204 and to a read-only memory (ROM) 1206. ROM 1206 may also be other types of storage media to store programs, such as programmable ROM (PROM), erasable PROM (EPROM), etc. Processor 1202 may communicate with other internal and external components through input/output (I/O) circuitry 1208 and bussing 1210 to provide control signals and the like. Processor 1202 carries out a variety of functions as are known in the art, as dictated by software and/or firmware instructions.

Server 1201 may also include one or more data storage devices, including disk drives 1212, CD-ROM drives 1214 and other hardware capable of reading and/or storing information, such as DVD, etc. In one embodiment, software for carrying out the above-discussed steps may be stored and distributed on a CD-ROM or DVD 1216, a removable media 1218 or other form of media capable of portably storing information. These storage media may be inserted into, and read by, devices such as CD-ROM drive 1214, disk drive 1212, etc. Server 1201 may be coupled to a display 1220, which may be any type of known display or presentation screen, such as LCD, plasma display, cathode ray tube (CRT), etc. A user input interface 1222 is provided, including one or more user interface mechanisms such as a mouse, keyboard, microphone, touchpad, touch screen, voice-recognition system, etc.

Server 1201 may be coupled to other devices, such as sources, detectors, etc. The server may be part of a larger network configuration as in a global area network (GAN) such as the Internet 1228, which allows ultimate connection to various landline and/or mobile computing devices.

The disclosed embodiments provide a method for configuring a dual/triple-source and a hexa-source to acquire two seismic datasets. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a general-purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for configuring a multi-source and a hexa-source for acquiring first and second seismic datasets to explore a subsurface with a shallow target resolution and with a deep target penetration, the method comprising:
    selecting a number n of source arrays to create the multi-source;
    selecting a number m of sub-arrays for each source array, each sub-array having a plurality of source elements;
    imposing a distance D between any two adjacent source arrays of the multi- source;
    selecting source elements from at least six different sub-arrays of the n source arrays to create the hexa-source;
    calculating and imposing a distance d between any two adjacent sub-arrays of a same source array among the n source arrays so that first bins and second bins associated with the first and second seismic datasets acquired using the multi-source and the hexa-source, respectively, are interleaved; and
    firing the multi-source to acquire the first dataset, and firing the hexa-source to acquire the second dataset,
    wherein the first bins and the second bins are defined on a surface of the subsurface and include reflection points associated with traces of the first and of the second seismic dataset, respectively.

2. The method of claim 1, wherein each of n and m is equal to or larger than 2.

3. The method of claim 1, wherein the first seismic dataset is used to image deep targets in the subsurface and the second seismic dataset is used to image shallow targets in the subsurface.

4. The method of claim 1, wherein n is 2 and m is 3 or n is 3 and m is 2.

5. The method of claim 1, wherein the step of calculating further comprises:
    calculating a distance between two adjacent sub-arrays that belong to different source arrays based on a streamer separation distance.

6. The method of claim 1, wherein all source elements available for acquiring the first and second seismic datasets form a set of source elements, the multi-source uses a first subset of the set of source elements and the hexa-source uses a second subset of the set of source elements.

7. The method of claim 6, wherein an intersection of the first subset and the second subset is zero.

8. The method of claim 7, wherein a union of the first subset and the second subset is exactly the set of source elements.

9. The method of claim 7, wherein a union of the first subset and the second subset is less than the set of source elements.

10. The method of claim 6, wherein an intersection of the first subset and the second subset is non zero.

11. The method of claim 1, wherein the first bins and the second bins are interleaved with no space in-between.

12. The method of claim 1, wherein the source elements of the hexa- source are located at a depth smaller than a depth of the source elements of the multi-source.

13. The method of claim 1, wherein an individual volume of each of the source elements of the hexa-source is smaller than 200 cu.in.

14. The method of claim 1, wherein the step of firing comprises:
    firing the hexa-source at least twice as often as firing the multi-source.

15. The method of claim 1, wherein the step of firing comprises:
firing the hexa-source six times and then firing the multi-source.

16. The method of claim 1, wherein the step of firing comprises:
alternately firing the hexa-source and the multi-source, with a shot point interval of the hexa-source that is smaller but not a multiple of a shot point interval for the multi-source.

17. The method of claim 16, further comprising:
skipping any shot point of the hexa-source when a firing time of the hexa-source at the shot point is less than 500 ms before or after a firing time of the multi-source.

18. A marine seismic acquisition system for acquiring first and second seismic datasets to explore a subsurface with a shallow target resolution and with a deep target penetration, the system comprising:
a number n of source arrays that constitute a multi-source, wherein any two adjacent source arrays of the multi-source are separated by a distance D, each source array having a number m of sub-arrays, each sub-array having a plurality of source elements and a distance d between any two adjacent sub-arrays of a same source array among the n source array,
wherein a hexa-source is made of selected source elements from at least six different sub-arrays of the n source arrays,
first bins and the second bins associated with the first and second datasets acquired using the multi-source and the hexa-source, respectively, are defined on a surface of the subsurface and include reflection points of traces associated with the first and of the second seismic dataset, respectively, and
the distance d is selected so that first bins and second bins are interleaved.

19. The system of claim 18, further comprising:
a controller configured to fire the multi-source to acquire the first seismic dataset, and to fire the hexa-source to acquire the second seismic dataset.

20. The system of claim 18, wherein all available source elements form a set of source elements, the multi-source uses a first subset of the set of source elements and the hexa-source uses a second subset of the set of source elements.

21. A computing device for controlling a multi-source and a hexa-source to acquire first and second seismic datasets to explore a subsurface with a shallow target resolution and with a deep target penetration, the computing device comprising:
an interface configured to receive a number n of source arrays of the multi-source and to receive a number m of sub-arrays for each of the n source arrays, each sub-array having a plurality of source elements; and
a processor connected to the interface and configured to,
apply a distance D between any two adjacent source arrays of the multi-source,
select source elements from at least six different sub-arrays to create the hexa- source,
calculate and apply a distance d between any two adjacent sub-arrays of a same source array among the n source arrays so that first bins and second bins associated with the first and second seismic datasets, respectively, are interleaved, and
fire the multi-source to acquire the first seismic dataset, and fire the hexa-source to acquire the second seismic dataset,
wherein the first bins and the second bins are defined on a surface of the subsurface and include reflection points associated with traces of the first and the second seismic dataset, respectively.

* * * * *